(12) United States Patent
Petersen (10) Patent No.: US 9,208,243 B2
(45) Date of Patent: Dec. 8, 2015

(54) SYSTEMS AND METHODS FOR PROCESSING MACHINE READABLE CODES BY A LOCKED DEVICE

(71) Applicant: Google Inc., Mountain View, CA (US)

(72) Inventor: Morten Just Petersen, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/149,548

(22) Filed: Jan. 7, 2014

(65) Prior Publication Data

US 2015/0193553 A1 Jul. 9, 2015

(51) Int. Cl.
*G06K 7/00* (2006.01)
*G06F 17/30* (2006.01)
*G06F 21/00* (2013.01)

(52) U.S. Cl.
CPC .......... *G06F 17/30879* (2013.01); *G06F 21/00* (2013.01)

(58) Field of Classification Search
USPC .................................. 235/435, 439, 451, 462
See application file for complete search history.

(56) References Cited

U.S. PATENT DOCUMENTS

| | | | | |
|---|---|---|---|---|
| 2007/0063050 A1* | 3/2007 | Attia et al. | ............... | 235/462.46 |
| 2008/0011847 A1* | 1/2008 | Silverbrook et al. | ......... | 235/435 |
| 2011/0066421 A1* | 3/2011 | Lee et al. | .......................... | 704/2 |

* cited by examiner

*Primary Examiner* — Matthew Mikels
(74) *Attorney, Agent, or Firm* — Troutman Sanders LLP; James E. Schutz; Scott D. Barnett (57) ABSTRACT

The disclosed technology includes automatically activating an image capture device responsive to determining that a mobile device in a restricted access state (e.g., a locked mobile device), is being held by a user. The image capture device may take pictures and the mobile device may determine whether the pictures contain a readable code, such as a QR Code or foreign text. Responsive to determining the pictures contain a readable code, the mobile device may process the readable code and display an indication of the readable code, for example, a decoded URL or translated text. In some implementations, the mobile device may automatically exit the restricted access state responsive to detecting or resolving a readable code and launch a corresponding application for viewing the indication of the readable code. In another implementation, the mobile device may wait for an authentication pattern or other confirmatory user input, before exiting the restricted access state and displaying the indication of the readable code.

20 Claims, 9 Drawing Sheets

SYSTEMS AND METHODS FOR PROCESSING MACHINE READABLE CODES BY A LOCKED DEVICE

BACKGROUND

Cameras attached to or included in mobile devices such as smartphones and tablets, are often used for functions beyond image or video capture (e.g., to scan a Quick Response (QR) Code or translate text). However, the user interface (UI) design and interaction flow of many camera applications ("apps") still mimic that of a traditional camera, making the use of these apps for such other functions somewhat inelegant. Moreover, for smartphones and tablets in particular, the additional steps of unlocking the mobile device and navigating to the camera app result in unnecessary delay and hassle.

In one example, QR Codes and other machine-readable codes offer an automated way of inputting data, such as a uniform resource locator (URL), to a mobile device. Scanning the QR Code with a camera attached to or included in a mobile device may cause the mobile device to open a webpage corresponding to the encoded URL. In some instances, however, identifying, navigating to, and launching an appropriate QR Code scanner application may take longer than manually typing the URL into a web browser application. Similar inefficiencies in UI design and interaction flow exist for language translation, currency conversion, and various other camera-based apps.

SUMMARY

Some or all of the above needs may be addressed by certain implementations of the disclosed technology. Certain implementations include automatically activating an image capture device at a mobile device in a restricted access state, responsive to determining the mobile device is being held, and, while the device is still in the restricted access state, scanning for readable codes. Responsive to detecting a readable code, the mobile device may exit the restricted access state and display an indication of the readable code. Accordingly, implementations of the disclosed technology may reduce time and user effort required to detect, scan, and perform an action based on a readable code.

According to an example implementation, a method is provided. The method may include receiving an indication of one or more sensor inputs at a mobile device in a restricted access state. Based on the indication, it may be determined that the mobile device is being held by a user. Responsive to determining the mobile device is being held, an image capture device, for example, a camera built into the mobile device, may be activated. The method may further include receiving at least one image from the image capture device. It may be determined that the received at least one image contains a readable code, such as a QR Code or foreign text. Responsive to determining that at least one image contains a readable code, the mobile device may at least partially exit the restricted access state and an indication of the readable code may be output for display at the mobile device, for example a resolved URL or translated text.

According to another example implementation, a computer readable medium is provided. The computer readable medium may store instructions that, when executed by at least one processor in a system, cause the processor to perform a method. The method may include receiving an indication of one or more sensor inputs at a mobile device in a restricted access state. Based on the indication, it may be determined that the mobile device is being held by a user. Responsive to determining the mobile device is being held, an image capture device, for example, a camera built into the mobile device, may be activated. The method may further include receiving at least one image from the image capture device. It may be determined that the received at least one image contains a readable code, such as a QR Code or foreign text. Responsive to determining that at least one image contains a readable code, a first indication of the readable code may be output for display at the mobile device, for example an image of the QR Code or foreign text. The method may yet further include receiving an indication of a user input, and responsive to the indication of the user input, exiting the restricted access state. The method may also include outputting for display a second indication of the readable code, for example, a resolved URL or translated text.

According to yet another example implementation, a system is provided. The system may include a memory operatively coupled to a processor and configured for storing data and instructions that may be executed by the processor. When executed, the system may be caused to receive, while a mobile device is in a restricted access state, an indication of one or more sensor outputs at the mobile device. Based on the indication, it may be determined that the mobile device is being held by a user. Responsive to the determining the mobile device is being held, an image capture device may be activated. The system be further caused to receive at least one image from the image capture device. Responsive to determining the received at least one image contains a readable code, a first indication of the readable code may be output for display. A prompt for an unlock input may also be output for display. Responsive to receiving an indication of a valid unlock input, the mobile device may exit the restricted access state and a second indication of the readable code output for display.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology include automatically scanning readable codes from a mobile device in a restricted access state. In some implementations of the disclosed technology, a mobile device may be configured to detect when it has been removed from a pocket of a user, responsively activate a built-in camera, and begin scanning for readable codes. In the event that the mobile device determines that an image captured while scanning contains part of a QR Code, the mobile device may output a corresponding alert. The mobile device may further be configured to determine that the QR Code encodes a URL, and responsively output a portion of the URL or an icon corresponding to a web browser application. In some implementations, the mobile device may also be configured to output a prompt for an unlock pattern. Upon receiving a valid unlock pattern, the mobile device may exit the restricted access state, automatically launch the web browser application, and navigate to the encoded URL.

Various readable codes may be used with implementations of the disclosed technology, including machine-readable codes and human-readable text. For example, in some implementations, a mobile device may be configured to read and launch a corresponding application for QR Codes, barcodes, fine print, faded text, words in foreign languages, Braille, currency values, math equations, etc.

Accordingly, various applications of the disclosed technology include decoding QR Codes and barcodes to human-readable form and/or navigating to a corresponding electronic resource; magnifying fine print or copying text to a virtual clipboard; revealing faded or hard to read text (e.g., by using an IR beacon); translating text, signs, and symbols to various languages; reading menus; converting between currencies; solving math problems; etc.

Throughout this disclosure, certain implementations are described by way of example in relation to methods for automatically scanning QR Codes from a mobile device in a restricted access state, and launching a corresponding application. However, implementations of the disclosed technology are not so limited, and may include scanning various other readable codes and text.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

In some implementations, a mobile computing device may have several operational states. In a first operational state, user interactions with the mobile computing device may be restricted to a lockscreen, or other similar mechanism for restricting user interactions through a GUI of the mobile computing device. In some instances, this state may be referred to herein as a "restricted access state", or a "locked" state. In a second operational state, one or more peripheral components or sensors of the mobile computing device may be deactivated or placed in a low-power mode, including a display of the mobile computing device. In some instances, this state may be referred to herein as an "a"/"sleep," "inactive," or "low-power" state. In a third operational state, substantially the entire mobile computing device may be powered down, including any CPUs of the mobile computing device. In some instances, this state may be referred to herein as an "off" or "powered-off" state. Even when in an "off" state, however, certain limited components of the mobile computing device may still be operational, for example, a power subsystem for managing charging of the mobile computing device.

Each of the above-disclosed states has a counterpart state, referred to herein as "unlocked"; "active" or "awake"; and "on" or "powered-on" states, respectively. For example, in some implementations, a mobile device may exit a restricted access state to reach an unlocked state. However, the above-disclosed states and their counterparts are merely labels for common operational states and may not represent an exclusive set of operational states. In some instances, a mobile device may operate at an intermediate state between a pair of counterpart states. For example, a mobile device may partially exit a restricted access state, or "unlock" to allow limited user interaction with a subset of applications or application functionality. Moreover, the above-disclosed states are not necessarily mutually exclusive. For example, in one implementation, a mobile device may be both locked and asleep, and in another implementation, awake and unlocked.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a mobile device by touching the surface of a presence-sensitive display using a finger. In another example implementation, a user may provide input to a mobile device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for automatically scanning readable codes from a mobile device in a restricted access state, according to example implementations of the disclosed technology, and will now be described with reference to the accompanying figures.

Figure 1:
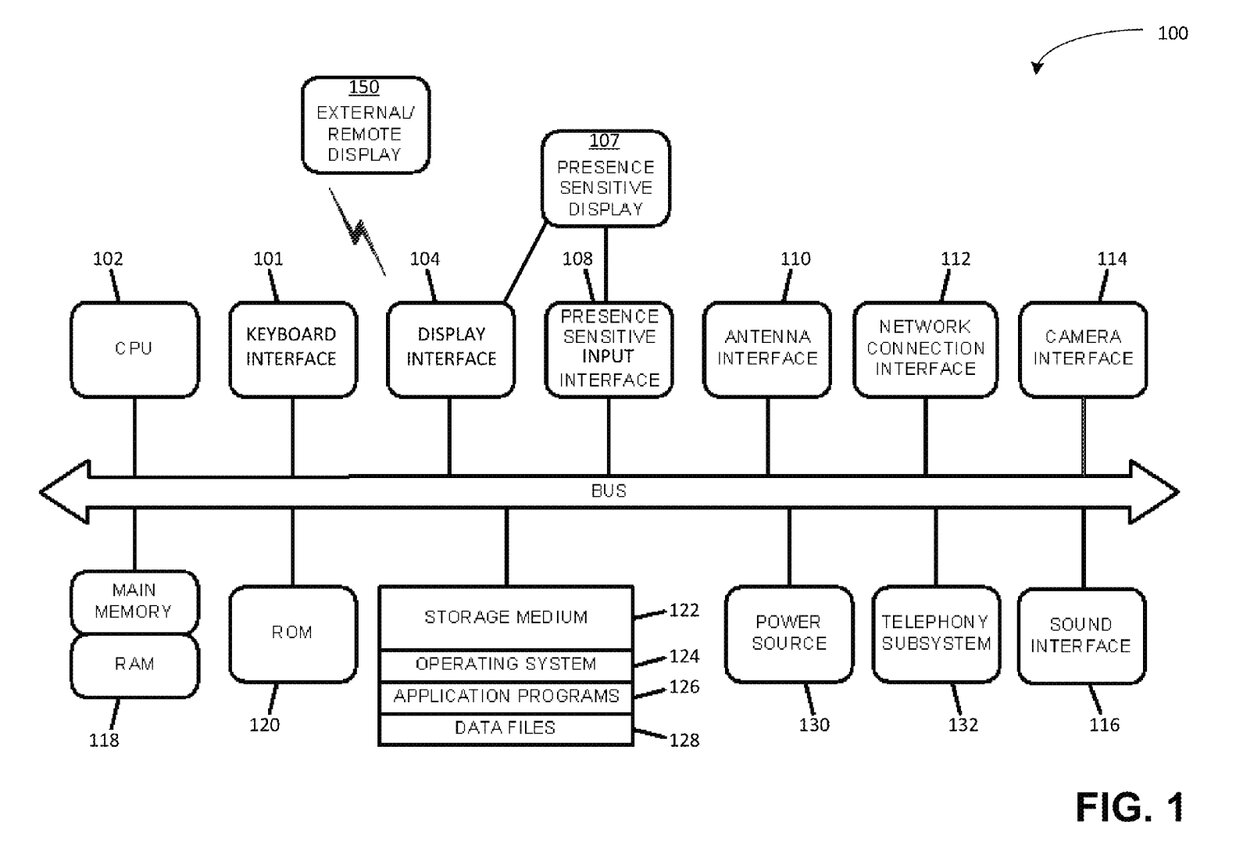
FIG. 1 depicts a block diagram of an illustrative computing device architecture 100, according to an example implementation.
Figure 2:
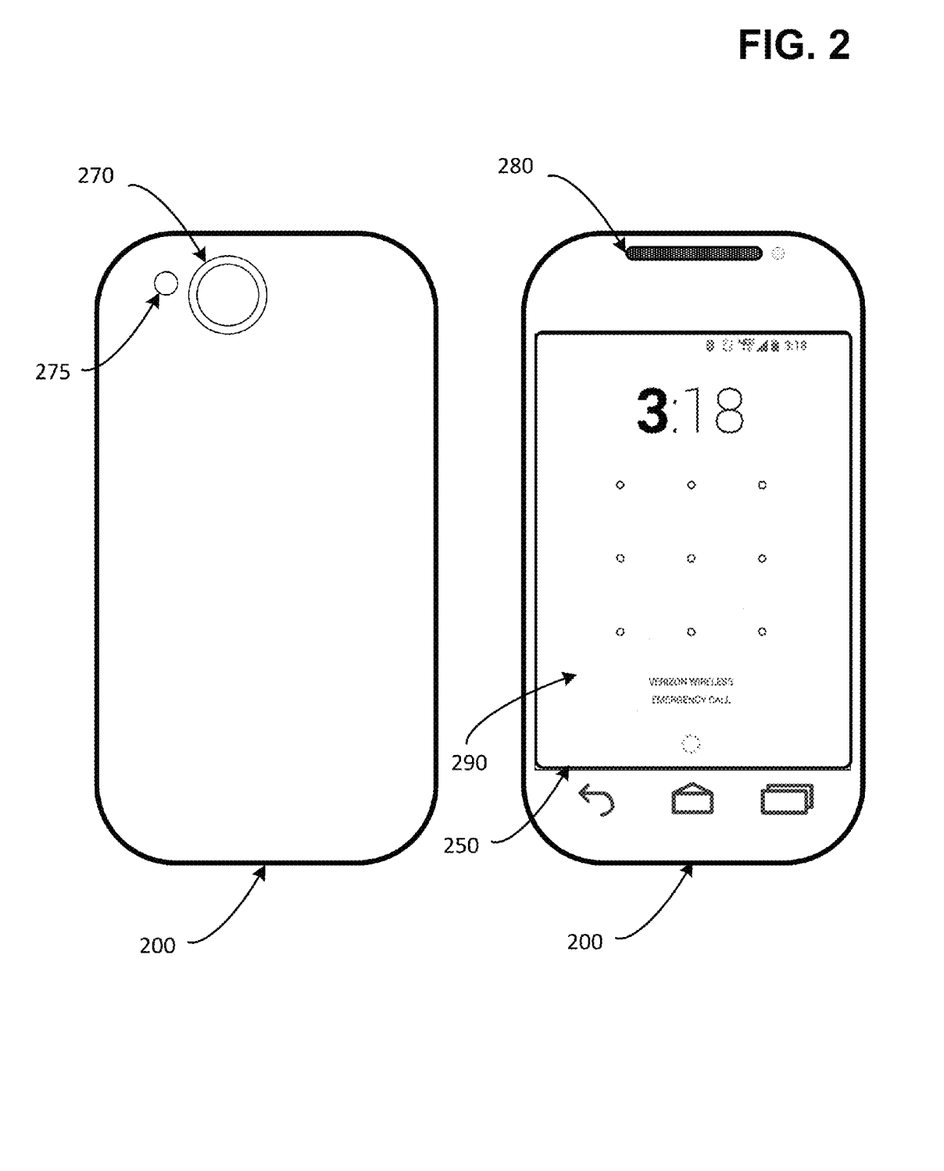
FIG. 2 depicts an illustration of a mobile computing device 200, according to an example implementation.

FIG. 1 depicts a block diagram of an illustrative computing device architecture 100, according to an example implementation. Certain aspects of FIG. 1 may be embodied in a computing device 200 (for example, a mobile device as shown in FIG. 2). As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes and a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device 200, such as a smartphone or tablet computer. In this example embodiment, the computing device may output content to its local display and/or speaker(s). In another example implementation, the computing device may output content to an external display device (e.g., over Wi-Fi) such as a TV or an external computing system.

In example implementations of the disclosed technology, the computing device 200 may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a mobile computing device 200, according to an example implementation. As shown in FIG. 2, the mobile computing device may be a mobile device, for example, a smartphone or a tablet. The mobile device may have a built-in or integrated display 250 for presenting a graphical user interface (GUI) 290 or other user interface. The display may be combined with a presence sensitive input device to form a touch-sensitive or presence-sensitive display for receiving user input from a stylus, finger, or other means of gesture input. In some implementations, the mobile computing device may also include or be associated with a sound producing device 280, such as a speaker, piezoelectric buzzer, or the like.

The mobile device 200 may be in communication with an image capture device 270. For example, as shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In certain implementations, the mobile device 200 may include one or more antennas or radios for wireless communication. These may include antennas for receiving GPS, Wi-Fi, or other radio communications. In addition, the mobile device may include one or more sensors for detecting, for example and without limitation, temperature, pressure, altitude, magnetic heading, etc.

As described herein, implementations of the disclosed technology may automatically scan readable codes from a locked mobile device. FIGS. 3-7 depict illustrations of a user interface 300 for automatically scanning readable codes, according to example implementations.

According to certain implementations, an image capture device 270 of a mobile device 200 in a restricted access state may be automatically activated while the mobile device remains in the restricted access state, or locked, responsive to determining that the mobile device is desired for active use by a user. Indications of a desire of a user to use the mobile device may be detected by various sensors of the mobile device. For example, the mobile device may determine that the device is being held by a user based on accelerometer or pressure sensor data. In another example, the mobile device may determine a change in ambient light based on light sensor data indicative of removal from a protective device cover or pocket. Various techniques for anticipating use of a computing device by a user are known in the art and are not discussed at length herein.

Figure 3:
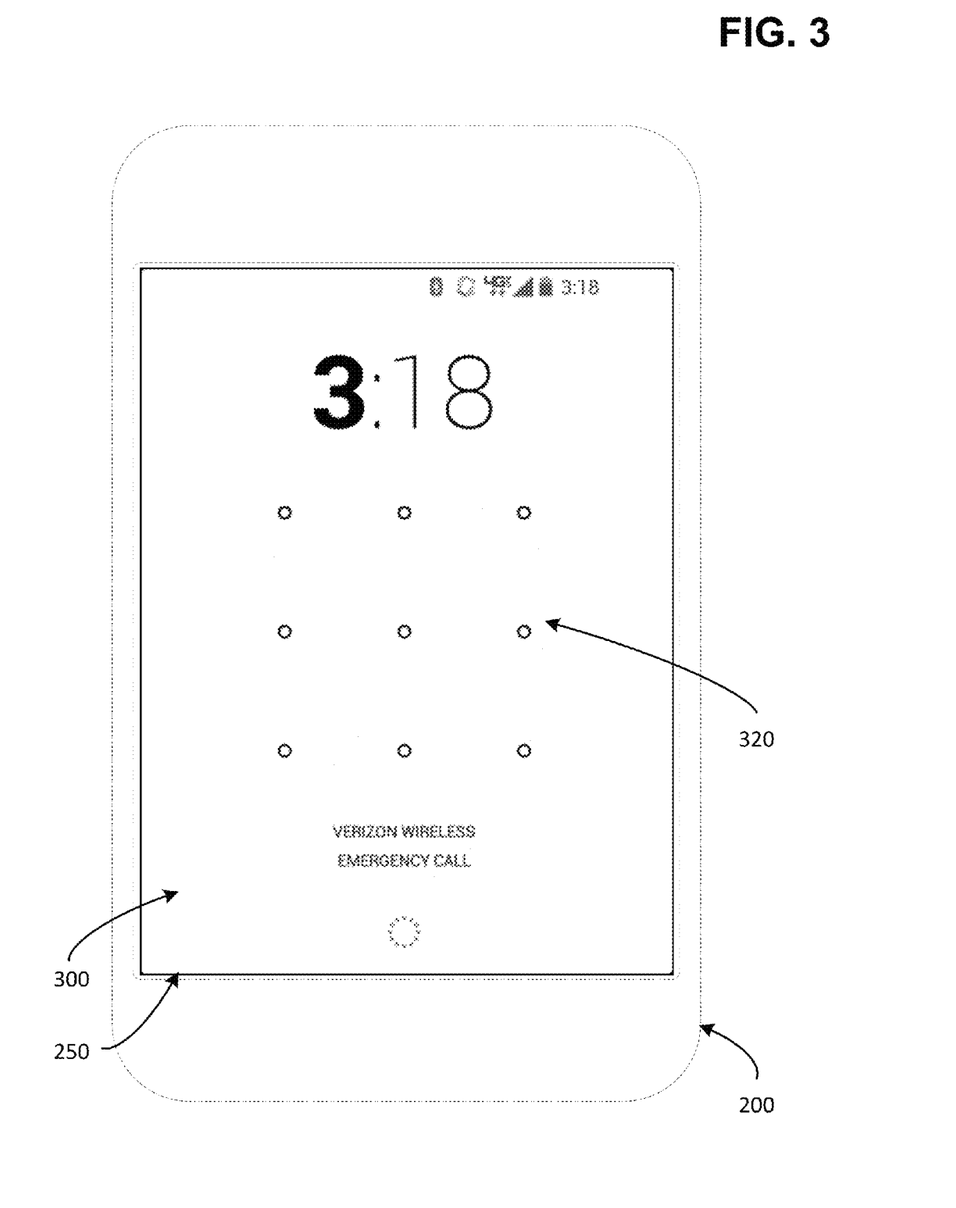
FIGS. 3-7 depict illustrations of a user interface 300 for automatically scanning readable codes, according to example implementations.

In some implementations, an indication to a user may be provided that the image capture device 270 has been activated. For example, an LED may be activated. In another implementation, as shown in FIG. 3, a display 250 of the mobile device 200 may be activated to show a GUI 290 while the image capture device 270 is active. Alternatively, the display may remain in a low-power or off state until a readable code is detected or a detected code is at least partially decoded or processed. Thus, in some implementations, a live preview is not shown while the image capture device is activated, although it can be. Accordingly, in some implementations, the image capture device 270 may activate while the mobile device is in a sleep state or in a restricted access state.

The image capture device 270 may take one or more pictures for analysis to determine if the captured images contain at least part of a readable code. In some implementations, the image capture device may continuously take pictures. In another implementation, the image capture device may periodically take pictures at a predetermined interval, for example every 200 milliseconds. In some implementations, the image capture device may include an always-on camera. In another implementation, if a readable code is not detected within a predetermined amount of time, or if the mobile device is determined to no longer be desired for use by a user, the image capture device may automatically deactivate.

According to certain implementations, the captured images may be analyzed by a processor to determine whether the images contain a readable code. In some implementations, a captured image may be rotated, color corrected, scaled, sharpened, distorted, or otherwise modified to detect a readable code contained therein. Various techniques for increasing the detectability of readable codes in a captured image are known in the art are not discussed at length herein.

In some implementations, the determining whether the images contain a readable code may be performed exclusively at the mobile device. In another implementation, at least part of the determining may be performed at a secondary computing device, for example, by a server in the cloud. In some implementations, an indication of a detected code may be presented for display at the mobile device 200. For example, the portion of an image determined to contain a readable code may be displayed responsive to detecting the code. In another implementation, user input may be required to confirm that the mobile device should proceed to decode or otherwise process the detected readable code.

In some implementations, a single image may contain only a portion of a readable code. Accordingly, it may be necessary to concatenate or otherwise combine multiple captured images to process a detected readable code. In some implementations, if only a partial code is detected, for example an incomplete portion of a QR Code, the mobile device 200 may provide an indication to a user to reposition the mobile device or otherwise suggest actions to improve the readability of the code.

For certain environmental conditions, it may be necessary to illuminate a target to ensure capture of an image enabling detection of a readable code. Accordingly, in some implementations, an illumination device 275 may be activated concurrently with the image capture device 270. Alternatively, the illumination device maybe selectively activated when it is suspected that a target contains a readable code, for example, responsive to a partial code being detected.

In an example implementation, the illumination device may direct radiation or acoustic energy outside the range of detectability by average humans towards a target, for example, infrared (IR) radiation. Accordingly, in some implementations, determining whether the images contain a readable code may include analyzing a spectra or other captured response from the target based on the illumination. In some implementations, IR radiation and other non-visible portions of the electromagnetic spectrum may be used detect text otherwise indiscernible to the human eye. For example, an illegible portion of a faded receipt may contain a QR Code detectable by the image capture device 270 when illuminated.

In some implementations, readable codes may be detected by firmware or specialized hardware associated with the image capture device. The use of specialized or dedicated firmware/hardware may improve efficiency and reduce battery consumption over using a general processor or CPU of the mobile device 200. Moreover, these subsystems may be active or activated even when a mobile device is in a sleep state. However, in some implementations, readable codes may be also or instead be detected a general processor or CPU of the mobile device.

According to certain implementations, a notification or other indication may be presented to a user at a display 250 of the mobile device 200 when a readable code is detected. Of course, aural, tactile, or other means of notification may also be used to indicate whether a readable code has been successfully detected, and to indicate other events or indications to a user disclosed herein.

According to certain implementations, a mobile device 200 in a restricted access state may automatically exit the restricted access state, or unlock, without intervening user input, responsive to a readable code being detected, or responsive to a detected readable code being processed. After exiting the restricted access state, the mobile device may present an indication of the readable code. The indication of the readable code may include, or be all or part of, the readable code itself, or a result of decoding or processing the readable code. In some implementations, the determining may be performed exclusively at the mobile device. In another implementation, at least part of the determining may be performed at a secondary computing device, for example, in the cloud. In another implementation, a detected code may be uploaded to another device for processing responsive to determining a detected code is not resolvable at the scanning mobile device.

In some implementations, presenting an indication of the readable code may include launching a corresponding viewer or other application. For example, presenting an indication of a QR code 405 encoding a URL may include navigating to the encoded URL in a web browser application at the mobile device. For example, FIG. 7, element 705, illustrates a web browser at a webpage corresponding to a QR Code 405. In another example, presenting an indication of a passage of foreign text may include launching a translation application with the foreign text as input. If there are multiple suitable applications or actions for a particular readable code or readable code type, a menu may be presented, or a default option selected.

In some implementations, text may be recognized as foreign if the text is in a language different from a predetermined or selected language, for example, a default language of the mobile device 200, or a language of the user interface of the mobile device. In another implementation, a target language may be pre-selected by a user for translation. Accordingly, the mobile device may determine whether to translate text or perform another action based on what language the text is in. Thus, for an example mobile device with the locale and language set to U.S. English, the device may attempt to translate any French text that is detected, while performing OCR on detected English text.

Some mobile devices 200 require authenticating user input, such as a password, authentication pattern, facial recognition, etc., to be entered at a lockscreen or authentication screen in order to exit the restricted access state. In some implementations, an automatically mobile device may advance past, or display the corresponding application "above," the lockscreen without receiving authenticating input from the user. In some of these instances, the mobile device may be restricted to user interactions with the corresponding launched application or related applications. To access functionality outside the launched application, a user may need to authenticate or perform other actions to unlock the device further.

Figure 4:
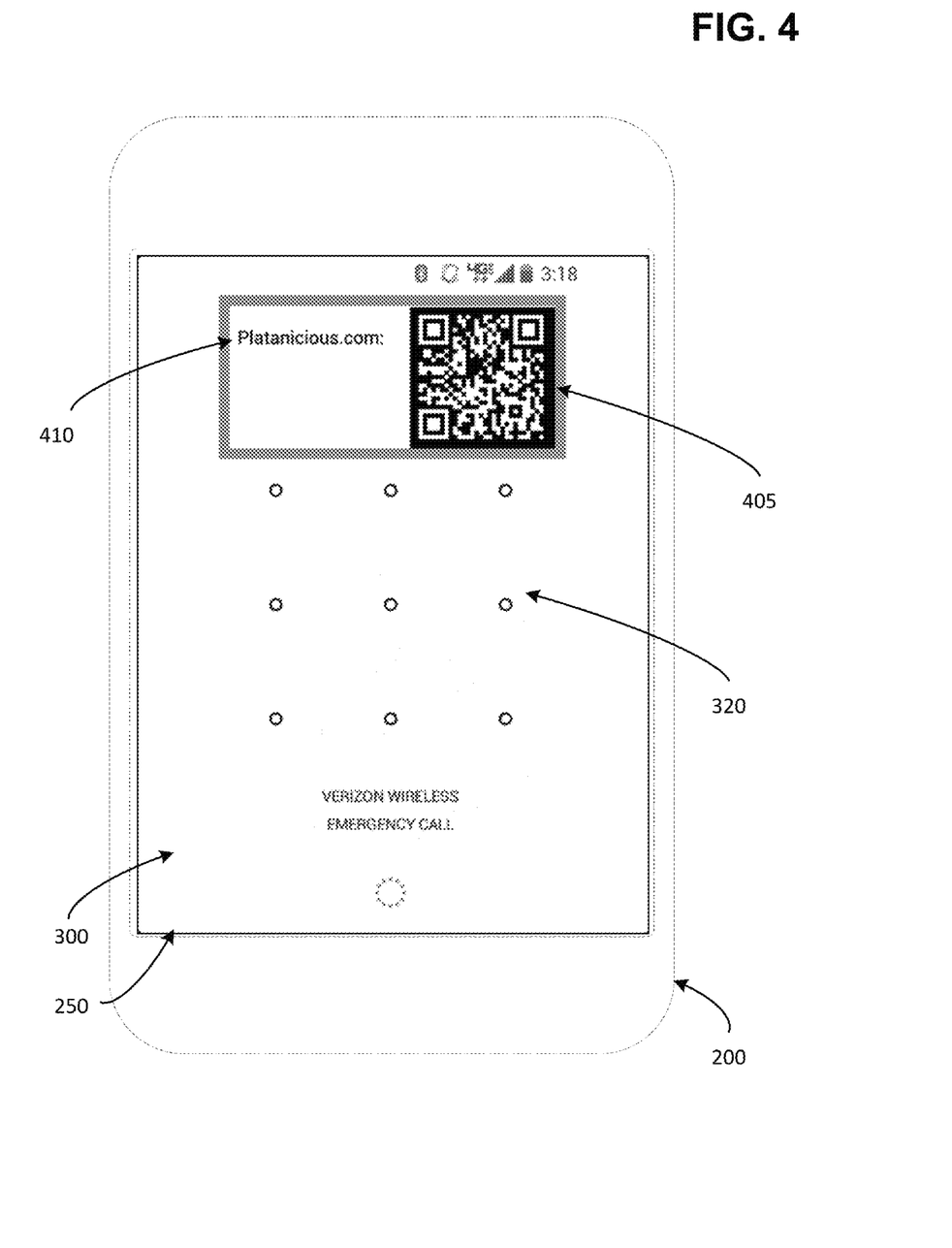
Figure 5:
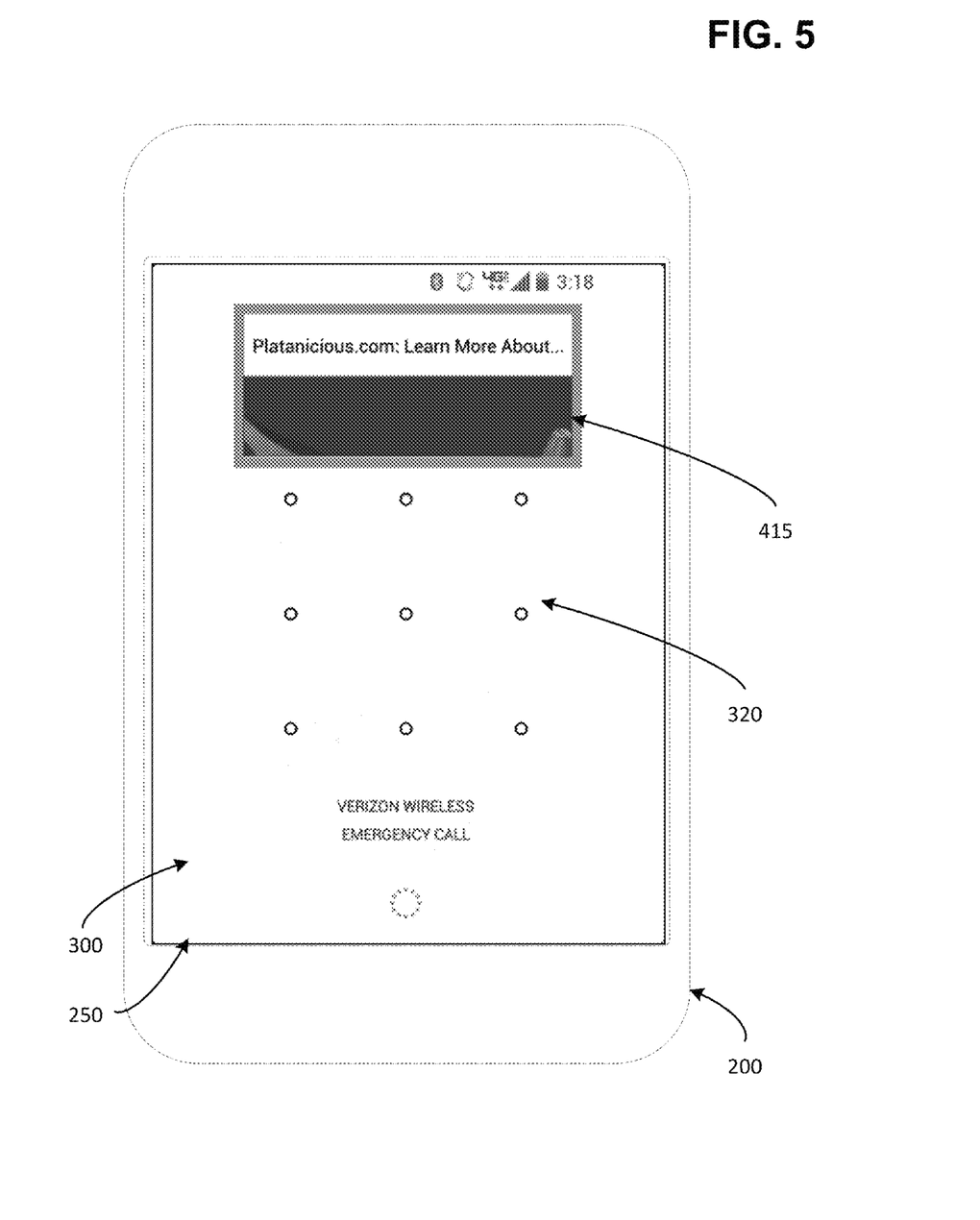
Figure 6:
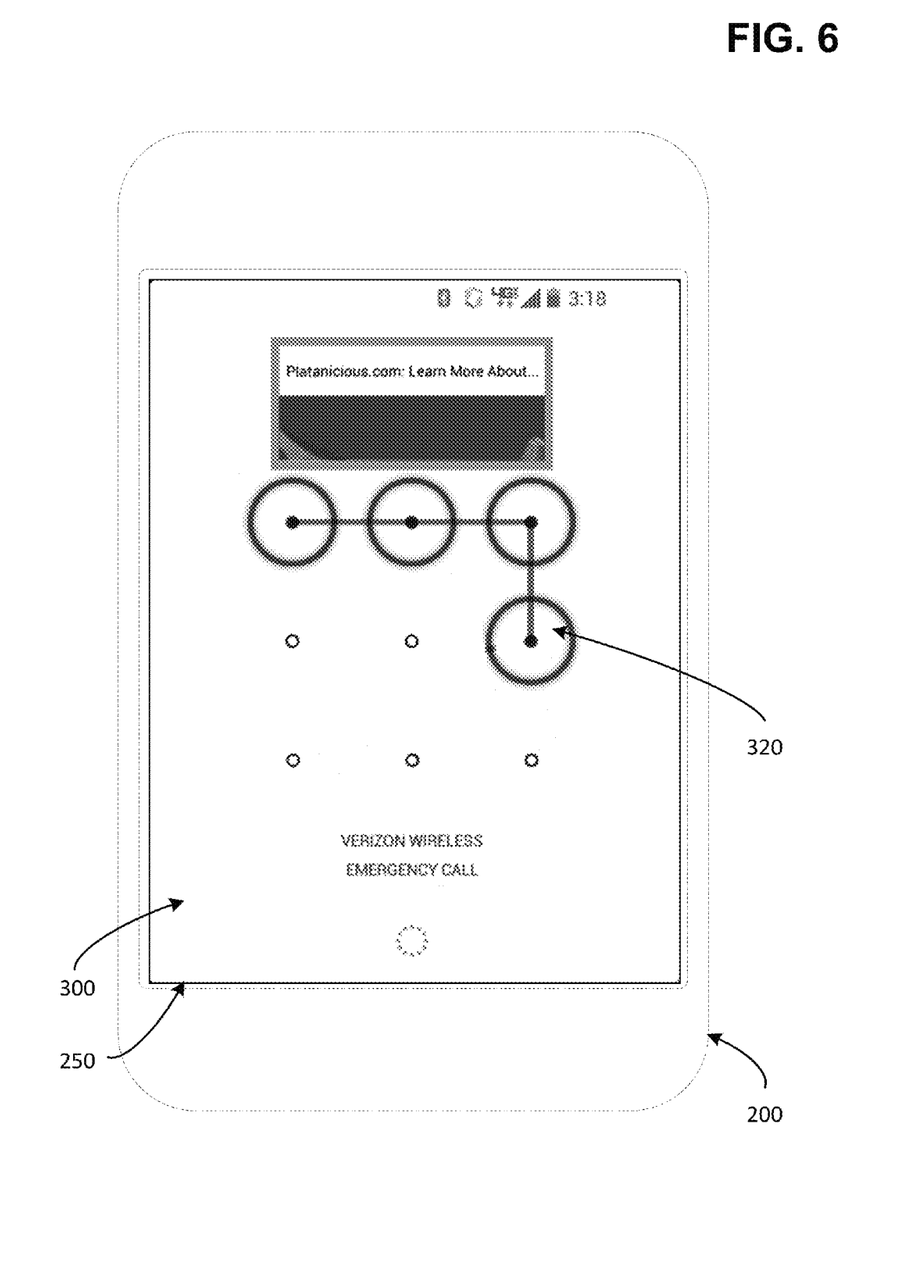
Figure 7:
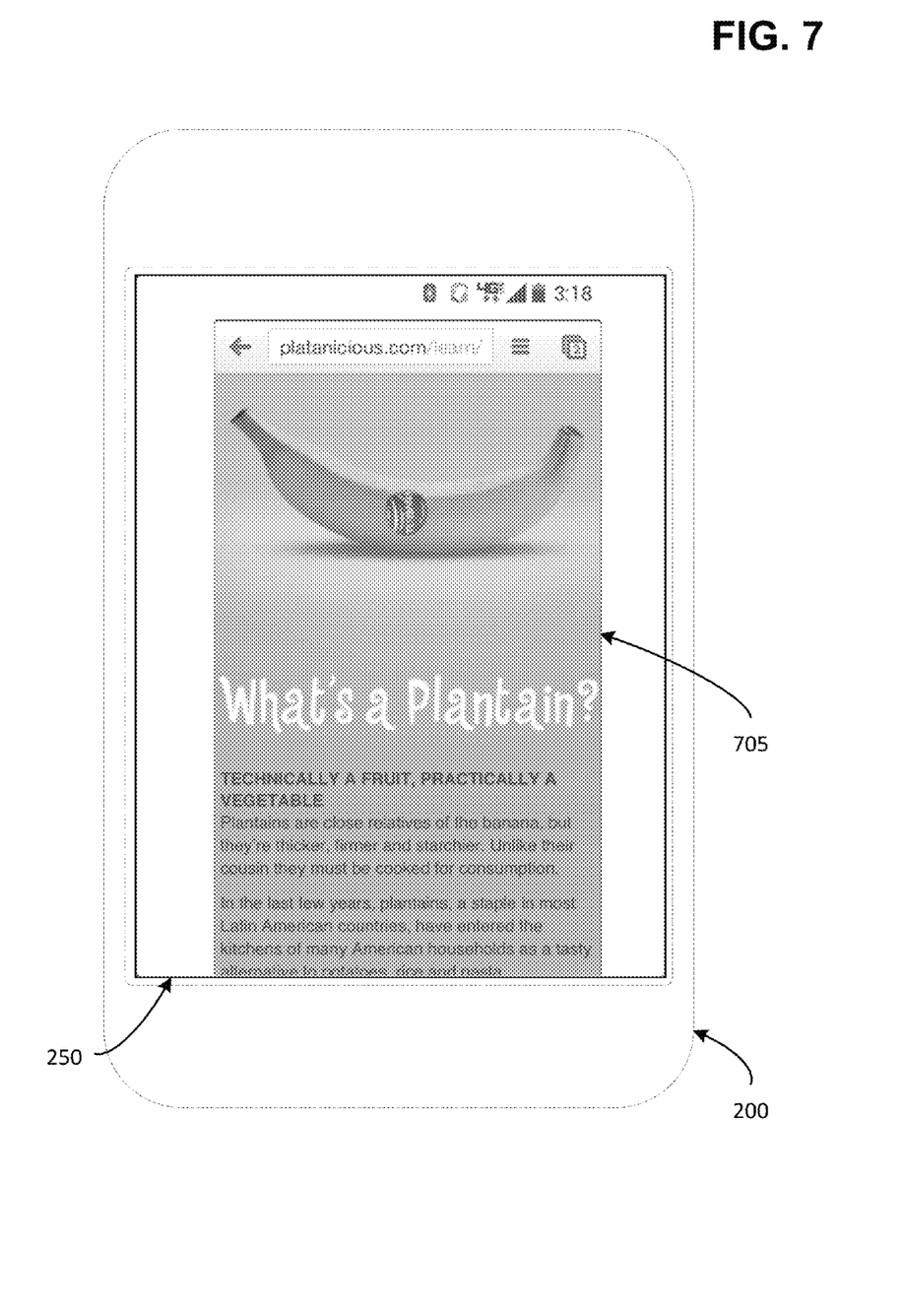

According to certain implementations, a mobile device 200 in a restricted access state may require intervening user input, responsive to a readable code being detected, or to a detected code being processed, before exiting the restricted access state. For example, user input may be required confirming that the user desires to navigate away from the lockscreen to view additional content related to the readable code. In some implementations, this user input may be or include authenticating user input. Accordingly, the mobile device may present a prompt for authenticating user input 320, as shown in FIGS. 3-6. In some implementations, this user input may be or include a user interaction with a displayed indication of a detected or processed readable code. For example, the mobile device may receive an indication of a tap from a user at either of elements 405 and 410, as shown in FIG. 4.

Thus, according to certain implementations, an indication of a detected or processed readable code may be presented at a mobile device 200 in a restricted access state before exiting the restricted access state. In some implementations, the indication may include, or be all or part of, the readable code itself. For example, as shown in FIG. 4, the QR Code 405 is displayed. The indication may also include or be a result of processing the readable code. For example, as shown in FIG. 4, the URL 410 encoded by the QR Code 405 itself is displayed, and in FIG. 5, the URL has been resolved and a partial preview of the corresponding webpage, or other web resource, is displayed. In another implementation, the indication may also be an icon representing a type of the detected readable code, or of a corresponding application or document associated with the type of code. For example, a detected QR Code may be indicated by presenting an icon for a QR Code scanner application, or for a web browser application if the QR Code encodes a URL. In some implementations, the detected readable code may be decoded or otherwise processed to provide and present a human-readable indication of the code.

Figure 8:
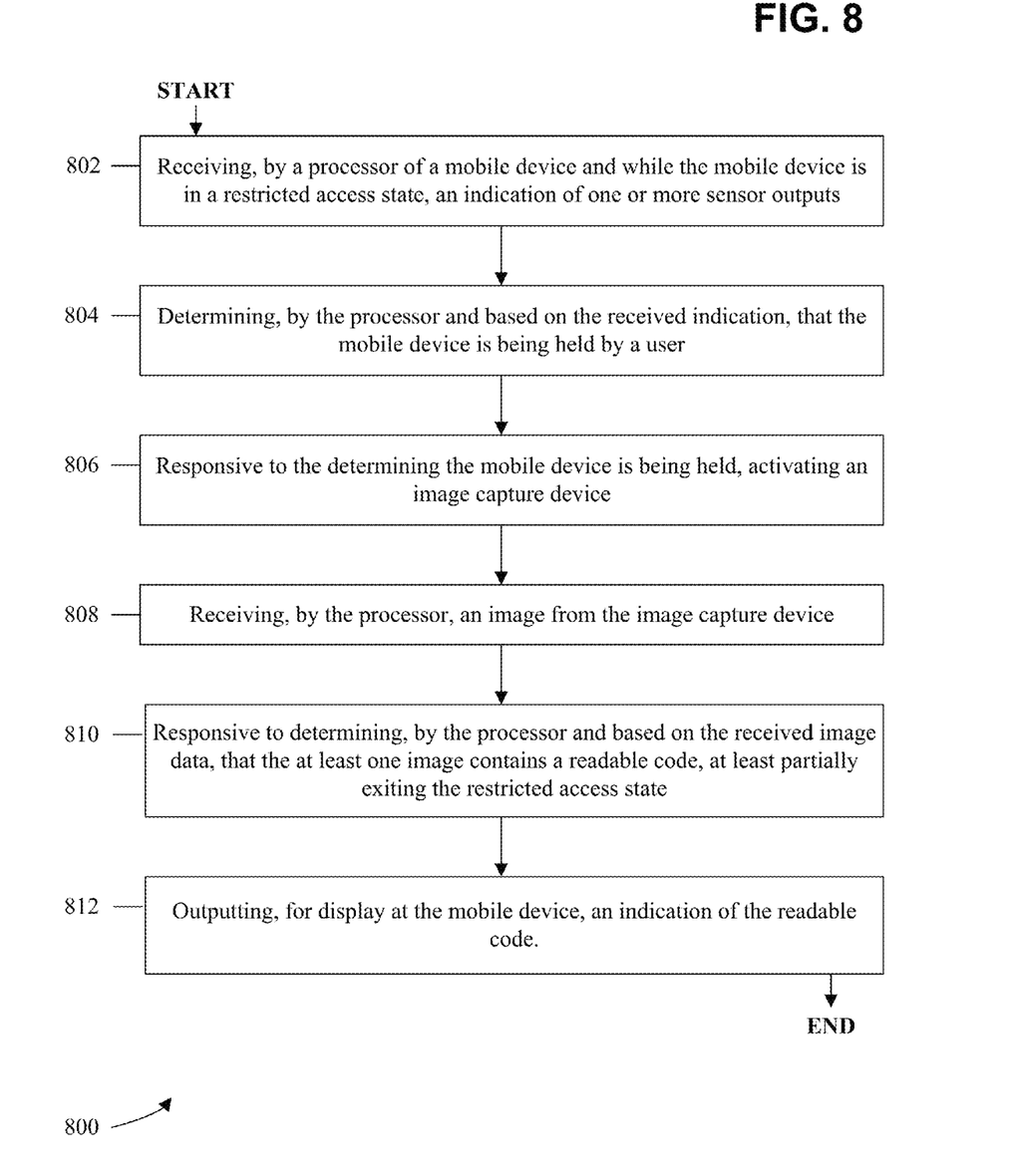
FIG. 8 is a flow diagram of a method 800 for automatically scanning readable codes from a locked device, according to an example implementation.

FIG. 8 is a flow diagram of a method 800 for automatically scanning readable codes from a locked device, according to an example implementation. As shown in FIG. 8, the method 800 starts in block 802, and, according to an example implementation, includes receiving, by a processor of a mobile device and while the mobile device is in a restricted access state, an indication of one or more sensor outputs. In block 804, the method 800 includes determining, by the processor and based on the received indication of the one or more sensor outputs, that the mobile device is being held by a user. In block 806, the method 800 includes responsive to the determining the mobile device is being held, activating an image capture device. In block 808, the method 800 includes receiving, by the processor, an image from the image capture device. In block 810, the method 800 includes, responsive to determining, by the processor and based on the received image data, that the at least one image contains a readable code, at least partially exiting the restricted access state. In block 812, the method 800 includes outputting, for display at the mobile device, an indication of the readable code.

Figure 9:
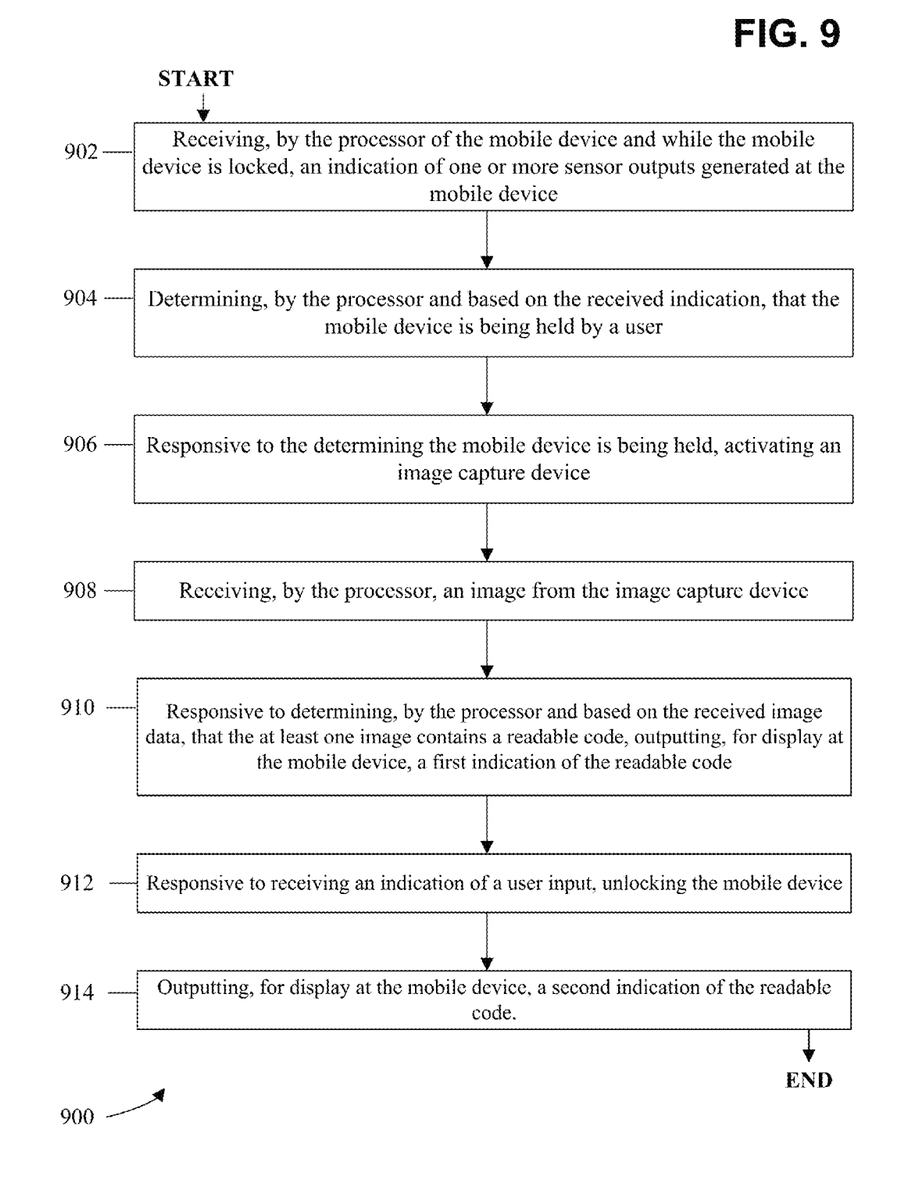
FIG. 9 is a flow diagram of another method 900 for automatically scanning readable codes from a locked device, according to an example implementation.

FIG. 9 is a flow diagram of another method 900 for automatically scanning readable codes from a locked device As shown in FIG. 9, the method 900 starts in block 902, and, according to an example implementation, includes receiving, by the processor of the mobile device and while the mobile device is in a restricted access state, an indication of one or more sensor outputs. In block 904, the method 900 includes determining, by the processor and based on the received indication of the one or more sensor outputs, that the mobile device is being held by a user. In block 906, the method 900 includes responsive to the determining the mobile device is being held, activating an image capture device. In block 908, the method 900 includes receiving, by the processor, an image from the image capture device. In block 910, the method 900 includes, responsive to determining, by the processor and based on the received image data, that the at least one image contains a readable code, outputting, for display at the mobile device, a first indication of the readable code. In block 912, the method 900 includes responsive to receiving an indication of a user input, exiting the restricted access state. In block 914, the method 900 includes outputting, for display at the mobile device, a second indication of the readable code.

It will be understood that the various steps shown in FIGS. 8 and 9 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method comprising:
receiving, by a processor of a mobile device and while the mobile device is in a restricted access state wherein user interactions at the mobile device are restricted, an indication of one or more sensor outputs;
determining, by the processor and based on the received indication of the one or more sensor outputs, that the mobile device is being held by a user;
responsive to the determining that the mobile device is being held, activating an image capture device;
receiving, by the processor, image data representative of at least one image from the image capture device;
responsive to determining, by the processor and based on the received image data, that the at least one image contains a readable code, at least partially exiting the restricted access state; and
outputting, for display at the mobile device, an indication of the readable code.

2. The method of claim 1, wherein the indication of the readable code is associated with a first application of the mobile device, and exiting the restricted access state comprises permitting user interactions at the mobile device with the first application and no other applications.

3. The method of claim 1, wherein the readable code is a Quick Response Code encoding a URI, the method further comprising:
navigating to a web resource corresponding to the URI, the indication of the readable code comprising a preview of a portion of the web resource.

4. The method of claim 1, the readable code being a URI, the method further comprising navigating to a web resource corresponding to the URI, the indication of the readable code comprising a preview of a portion of the web resource.

5. The method of claim 1, the readable code comprising text, the method further comprising performing optical character recognition, the indication of the readable code comprising an editable version of the text.

6. The method of claim 1, wherein the mobile device is associated with a predetermined first language, the method further comprising determining the readable code is text in a second language other than the predetermined first language, the indication of the readable code comprising a translation of the text, the translation being in the predetermined first language.

7. The method of claim 6, the predetermined first language being a selected language of a user interface of the mobile device.

8. A computer-readable medium that stores instructions that, when executed by at least one processor of a mobile device, cause the mobile device to perform a method comprising:
receiving, by the processor of the mobile device and while the mobile device is restricted access state, an indication of one or more sensor outputs wherein user interactions at the mobile device are restricted through a GUI of the mobile device;
determining, by the processor and based on the received indication of the one or more sensor outputs, that the mobile device is being held by a user;
responsive to the determining the mobile device is being held, activating an image capture device;
receiving, by the processor, image data representative of at least one image from the image capture device;
responsive to determining, by the processor and based on the received image data, that the at least one image contains a readable code, outputting, for display at the mobile device, a first indication of the readable code;
responsive to receiving an indication of a user input, exiting the restricted access state; and
outputting, for display at the mobile device, a second indication of the readable code.

9. The method of claim 8, further comprising:
outputting, at the mobile device, a prompt for an unlock input, the indication of the user input comprising an unlock input.

10. The method of claim 8, further comprising:
determining a type of the readable code, the outputting the first indication of the readable code comprising outputting an indication of the type of the readable code.

11. The method of claim 8, further comprising:
determining a type of the readable code, the outputting the first indication of the readable code comprising outputting an indication of applications associated with the type of the readable code.

12. The method of claim 8, the first indication of the readable code comprising a view of at least a portion of the at least one image.

13. The method of claim 8, the readable code being a Quick Response Code encoding a URI, the method further comprising accessing a resource corresponding to the URI, the second indication of the readable code being an indication of the resource.

14. The method of claim 8, the readable code being a URI, the method further comprising accessing a resource corresponding to the URI, the second indication of the readable code being an indication of the resource.

15. The method of claim 8, the readable code comprising text, the second indication of the readable code comprising an enlarged view of at least a portion of the text.

16. The method of claim 8, wherein the mobile device is associated with a predetermined first language, the method further comprising determining the readable code is text in a second language other than the predetermined first language, the second indication of the readable code comprising a translation of the text, the translation in being in the predetermined first language.

17. The method of claim 16, the predetermined first language being a target language selected by the user.

18. A system comprising:
at least one memory operatively coupled to at least one processor and configured for storing data and instructions that, when executed by the at least one processor, cause the system to:
receive, by the processor of a mobile device and while the mobile device is restricted access state wherein user interactions at the mobile device are restricted through a lockscreen of the mobile device, an indication of one or more sensor outputs restricted access state;
determine, by the processor and based on the received indication of the one or more sensor outputs, that the mobile device is being held by a user;
responsive to the determining the mobile device is being held, activate an image capture device;
receive, by the processor, image data representative of at least one image from the image capture device;
responsive to determining, by the processor and based on the received image data, that the received at least one image contains a readable code, output, for display at the mobile device, a first indication of the readable code;
output, for display, a prompt for an unlock input;
responsive to receiving an indication of an unlock input, unlock the mobile device; and
output, for display at the mobile device, a second indication of the readable code.

19. The system of claim 18, the data and instructions further causing the system to:
further responsive to the determining the mobile device is being held, activate an illumination device, the determining the received at least one image contains the readable code comprising analyzing a spectrum of the received at least one image corresponding to the illumination device.

20. The system of claim 19, the illumination device comprising an IR emitter.

* * * * *